United States Patent [19]
Judson et al.

[11] 3,908,641
[45] Sept. 30, 1975

[54] ELECTROCARDIOGRAPH WITH IMPROVED STYLUS CONTROL CIRCUITS

[75] Inventors: Donald William Judson, Simi Valley; Glenn Roy Tormey, Jr., San Fernando, both of Calif.

[73] Assignee: The Birtcher Corporation, Los Angeles, Calif.

[22] Filed: June 7, 1974

[21] Appl. No.: 477,255

[52] U.S. Cl. ........ 128/2.06 G; 346/33 ME; 346/51; 346/76 R; 346/139 C
[51] Int. Cl.² ............................................. A61B 5/04
[58] Field of Search... 128/2.05 Q, 2.06 BF, 2.06 R, 128/2.06 V; 346/33 ME, 51, 52, 54, 57, 76 R, 346/87, 139 C, 143; 219/216

[56] References Cited
UNITED STATES PATENTS

| | | | |
|---|---|---|---|
| 2,674,992 | 4/1954 | Gilson et al. | 128/2.06 G |
| 3,327,312 | 6/1967 | Hamilton et al. | 346/76 |
| 3,478,364 | 11/1969 | Frank | 128/2.06 B |
| 3,781,902 | 12/1973 | Shim et al. | 219/216 |

*Primary Examiner*—William E. Kamm
*Attorney, Agent, or Firm*—Jackson & Jones

[57] ABSTRACT

An electrocardiograph unit employing a marker stylus and a writing stylus for recording signals on heat sensitive paper is disclosed. The writing stylus, upon operation of a run switch, is heated first by an immediate burst of high energy heating current and then is heated by a predetermined threshold level of heat current. The marker stylus receives continuous heat and upon operation of the run switch, automatically generates a series of time reference marks by momentary movements into and out of contact with the paper. An operator can selectively open and close an encoding switch which overrides the automatic timing feature and commands the marker stylus to encode "Morse Code type" signals on the paper. These coding signals are indicative of the particular cardiac waveforms then being written on the paper by the writing stylus.

10 Claims, 4 Drawing Figures

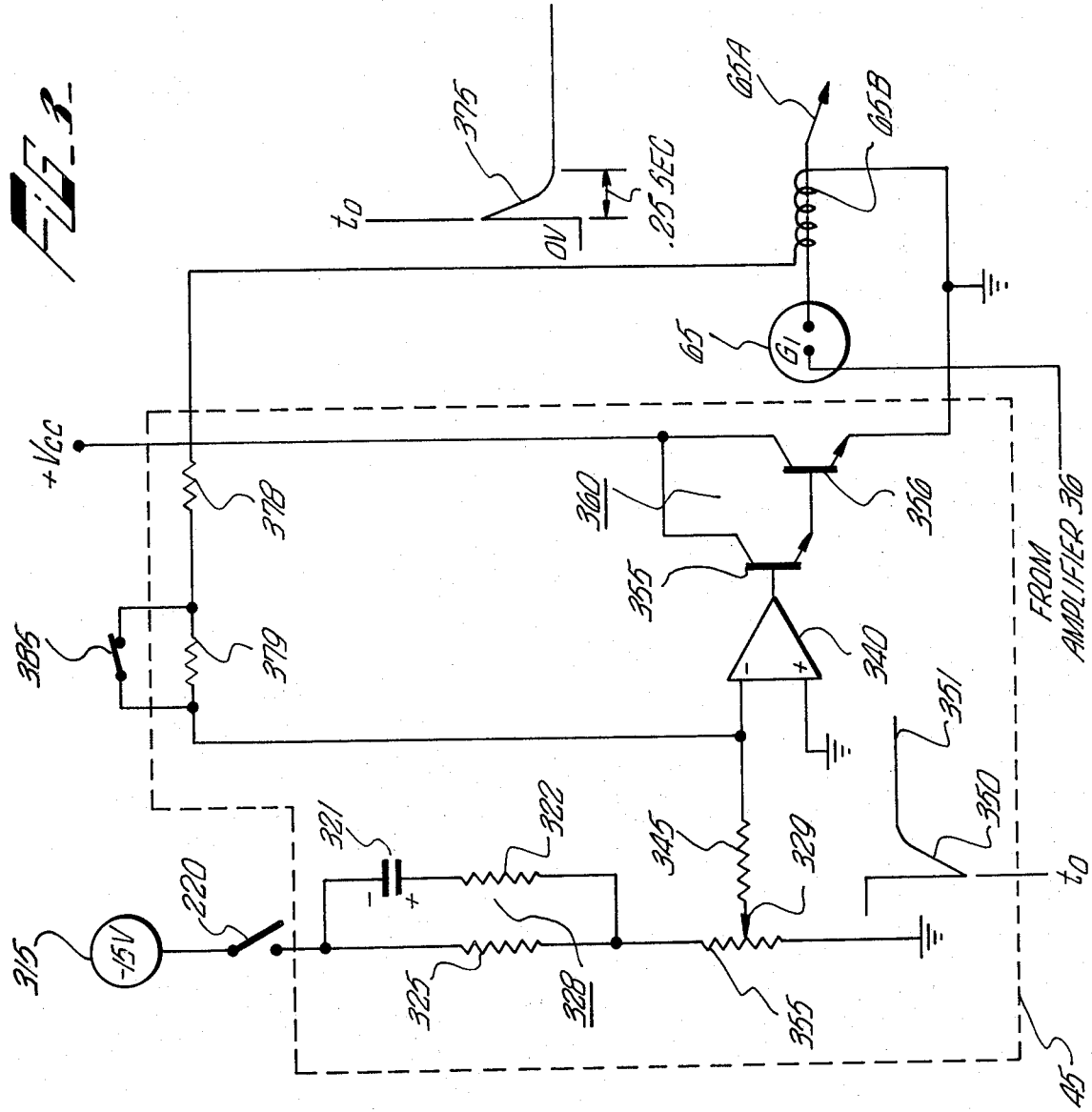

ELECTROCARDIOGRAPH WITH IMPROVED STYLUS CONTROL CIRCUITS

BACKGROUND OF THE INVENTION

1. Field of the Invention

This invention pertains to medical instrumentation and more particularly relates to electrocardiograph testing apparatus for measuring a patient's cardiac waveforms.

2. Description of the Prior Art

Electrocardiograph units for depicting signals indicative of the heart activity on heat sensitive strip chart recorder paper are well known. Different signal waveforms associated with a patient's heart are analyzed by one skilled in the art of electrocardiogram analysis. Various signal combinations electrically depict the heart's condition based primarily upon its location within the patient's chest cavity. It is essential, for proper analysis of the waveforms recorded on the strip chart recorder paper, that the particular waveform being analyzed is properly identified.

Successful analysis also requires that a time reference base on the paper be available so that various portions of the waveform can be correlated with time. Correlation of the time reference base and supplying a label identifying each of the individual waveforms has proven to be a difficult problem in the prior art devices.

For example, in prior art devices, most devices do not provide any means for labeling the waveforms prior to the time that they are recorded on the paper by the writing stylus. In such devices it is left to the operator to remember to manually place a label on the paper after the various traces are obtained. Incorrect labeling or no labeling at all is the inevitable result for many tests employing such prior art devices.

In known prior art devices, an operator pushes a run button, which button, when operated, starts the strip chart recorder paper in motion. Heat in such devices is continually applied to the writing stylus for tracing the cardiac waveforms. The stylus must receive a specific amount of heat in order to achieve the desired darkness for the various cardiac traces. Because the paper is stationary until the operator starts a run, the stylus creates a large darkened area at the beginning of the trace. In some instances of high stylus heat (for a very dark trace) the stylus has been known to burn the paper. Such devices create a potentially dangerous fire hazard; and in many instances totally obliterate the beginning portion of each cardiac waveform trace.

In an effort to avoid the above-noted problems associated with the prior art devices, the operation of a run button was employed to trip a delay circuit. The delay circuit attempted to prevent the recorder paper from starting in motion until a heat circuit could slowly warm the writing stylus to a proper temperature. This technique has not proven successful because the operator in many cases believes the machine is not operating properly due to the delay. As a result the operator takes "corrective" action by pushing other buttons, manually moving the paper etcetera all to the detriment of the unit. Furthermore, the delay time at the initiation of a trace has created complex timing problems in attempting to analyze waveforms relative to a time base.

The above-noted disadvantages of the prior art are overcome by the principles of this invention wherein an electrocardiograph unit includes a normally cold writing stylus and a heat control circuit for immediately applying a high energy heat signal to instantaneously heat the stylus when the run button is operated. A marker stylus provides a dual function of recording encoded signals indicative of the cardiac waveform being traced together with an accurate time reference base.

SUMMARY OF THE INVENTION

In the electrocardiograph unit of this invention, a marker stylus is employed as is a writing stylus. The marker stylus is provided with continuous heat when the electrocardiograph unit is in operation. It is positioned typically along a margin of the paper and out of contact with the strip chart recorder paper. A timing device and a solenoid repetitively move the marker stylus into and out of contact with the paper in order to supply a time reference mark along the paper's margin.

Each particular cardiac signal which is being written by the writing stylus during operation of the cardiograph unit is identified in a simple and reliable manner in this invention. An operator merely closes and opens an encoding switch to designate the particular cardiac waveforms in question by Morse Code type marks. Closure of the encoding switch causes the timing device to be momentarily overridden until the marker stylus has finished applying the encoded marks indicative of the particular electrocardiogram waveform then being written on the paper by the waveform stylus. After the encoding operation is completed the encoding switch is released and the timing circuit automatically resumes control over the marker stylus to record a time reference on the paper.

In the electrocardiograph unit of this invention, operation of the run switch immediately starts to strip chart recorder paper and the writing stylus heat control circuit. The heat control circuit includes a negative feedback signal processing circuit which responds to the application of a run voltage by automatically supplying a high burst of electrical current to the writing stylus. The burst is selected in magnitude and duration so that it imediately heats the writing stylus to a desired temperature. The high heat burst is present for a short duration, and then the heat to the writing stylus automatically achieves a predetermined level which is thereafter maintained.

The electrocardiograph unit of this invention accomplishes the above-noted features for at least two distinct paper speeds. Such paper speeds are accommodated by impedances which are inserted or removed from the negative feedback portion of the writing stylus heat control circuit.

The principles of this invention thus provide an electrocardiograph unit having a marker stylus for accomplishing the dual function of (a) supplying encoded marks indicative of the electrocardiograph waveform being traced out on the recorder paper by the waveform stylus, and (b) supplying an accurate time reference mark after the encoding marks. The writing stylus of the electrocardiograph unit of this invention is maintained in a cold condition until the operator presses a run button. At that moment, a burst of current supplies heat to immediately bring the writing stylus to a writing temperature, which heat is automatically controlled by writing stylus temperature control circuitry to thereafter hold the writing stylus at a predetermined heat.

BRIEF DESCRIPTION OF THE DRAWINGS

FIG. 1A is a diagram symbolically illustrating well known cardiac vector locations and cardiac waveform shapes;

FIG. 3 is a detailed circuit schematic of the writing stylus heat control circuit shown in block form in FIG. 1.

DESCRIPTION OF THE PREFERRED EMBODIMENT

Figure 1:
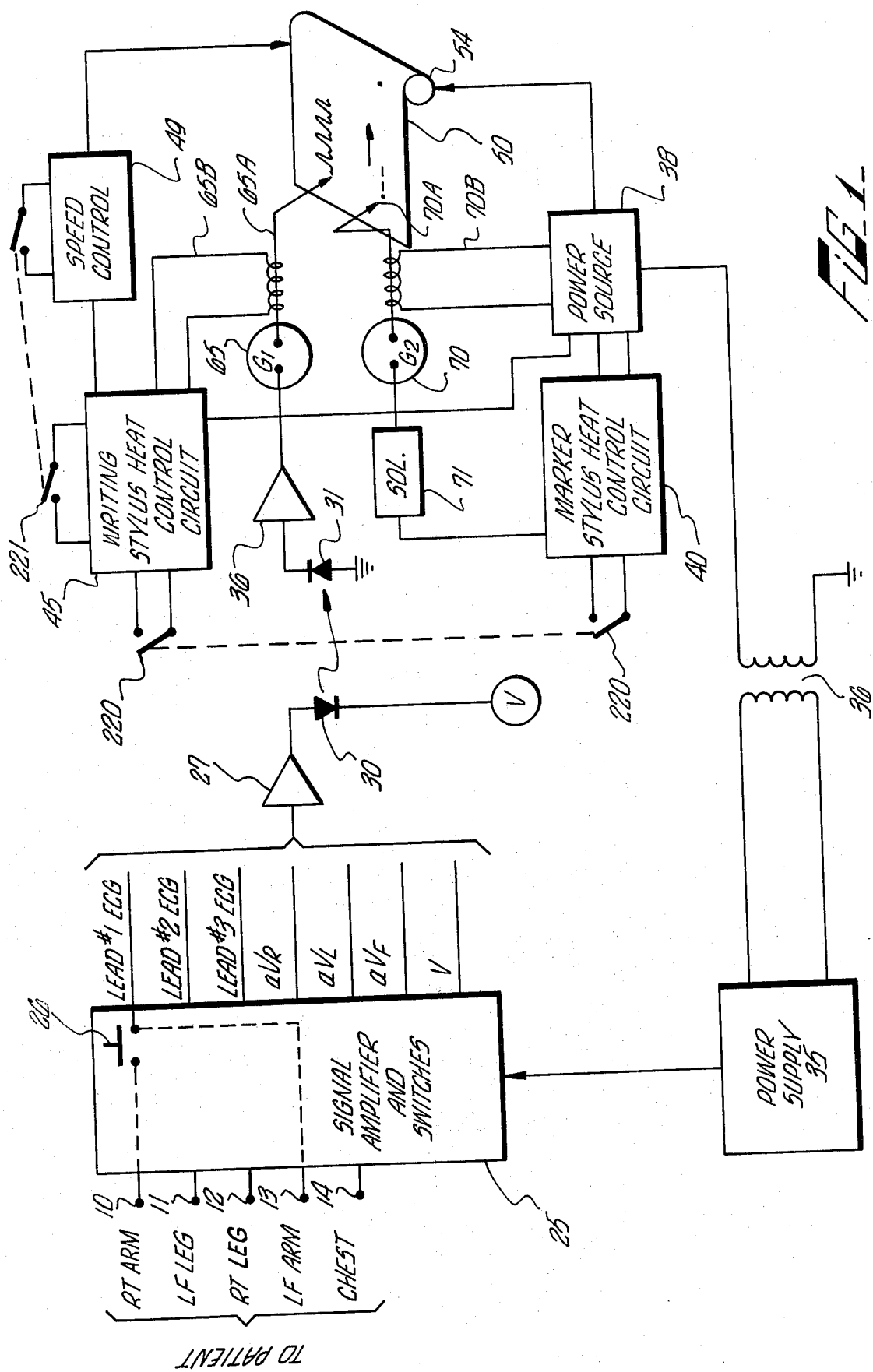
FIG. 1 is a block diagram of an improved electrocardiograph system in accordance with the principles of this invention.

Turning now to FIG. 1, a series of electrodes 10 through 14 are shown. The electrodes are appropriately labeled to indicate the location of attachment of such electrodes to the body of a patient whose electrocardiograph is to be measured. It is well known in the art of biophysical measurements to clean the electrodes prior to their application to any suitable part of a patient's right leg, left leg, right arm, left arm and several predetermined chest locations.

A patient's heart generates electrical activity which establishes potentials at the surface of the patient's body. An electrocardiograph receives signals indicative of the electrical potentials at the various electrodes. Those received signals are processed and the electrocardiograph records waveforms which display the difference in various combinations of the potentials sensed by electrodes 10 through 14. During signal processing, output signals from the electrodes are applied to signal amplifiers and switching circuits shown in block form as element 25 in FIG. 1. Because various electrode combinations are required to electrically depict the heart's condition, it is standard in the art to provide a plurality of switches which interconnect in a known manner, the individual signals sensed by the various electrodes.

Each heart measurement is depicted on a display by a signal waveform which is related to the potentials measured at the various electrodes on the patient's body as compared to certain other measured potentials. These known techniques are fully described for example in the Tektronics First Edition of "Biophysical Measures" copyrighted 1970, Tektronics, Inc., Beaverton, Ore.

In the referenced article, at pages 49 through 59, a plurality of output signals known in the art as Lead No. 1 ECG, Lead No. 2 ECG, Lead No. 3 ECG, $aV_R$, $aV_L$, and $aV_F$ and V are described. The Tektronics reference fully describes, in a detailed analysis, the various designations and signal combinations required for presentation of displayed signals representing these output signals. Briefly, however, the electrical potential within the heart is projected along planes such as a frontal plane on the chest of the patient's body as depicted in FIG. 1A. Lead No. 1 ECG is the waveform which depicts a vector, known in the art as an R wave, from the right arm to the left arm.

Referring to FIG. 1, switch 26 connects electrode 10 associated with the right arm to electrode 13 associated with the left arm so as to supply an output on Lead No. 1. The output signal is a potential difference which is referred to in the art as an R wave of Lead No. 1 ECG. Other switches (not shown) in a well known manner connect the other various input electrodes as is required to generate other R waves for the other output leads depicted in FIG. 1.

FIG. 1A depicts the various cardiac vectors together with illustrative sample waveforms of the relative amplitude and angular position of the cardiac vectors as are normally presented on an electrocardiograph display. Such a display, for example, may typically be a strip chart recorder 50, FIG. 1.

Output signals from the various cardiac R waves are supplied as analog signals to an amplifier 27, the output of which is connected to an optical diode 30. It is essential, of course, that a patient be electrically isolated from current from the electrocardiograph equipment that generates and displays the waveforms indicative of the various R waves. Such electrical isolation is achieved by utilizing optical coupling between diode 30 and a photosensitive diode 31. Similarly, power for the unit is divided into two portions 35 and 38 which are isolated from each other by a transformer coupling 36. This optical and electrical isolation is fully described and claimed in U.S. Pat. No. 3,808,502 issued Apr. 30, 1974 entitled "ISOLATOR CIRCUIT FOR USE WITH ELECTRICAL MEDICAL EQUIPMENT" by Algis John Babilius and assigned to the same assignee as the present application. The optical and electrical isolation thus need not be described in further detail herein.

Source 38 supplies power to a marker stylus control circuit 40, a writing stylus heat control circuit 45 and to a strip chart recorder motor 54. Power source 38 also supplies heating current to the stylus arms of two galvanometers $G_1$ and $G_2$ identified as elements 65 and 70 in FIG. 1.

Optical signals coupled between diode 30 and diode 31 are converted to electrical signals for amplification by a standard high-gain amplifier 36. Amplified signals from amplifier 36 are employed to drive a galvanometer 65. Galvanometer 65 includes a writing stylus 65A. Stylus 65A is in continuous contact with strip chart recorder paper 50. When the unit is in operation by closure of run switch 220, stylus 65A forms a trace of the particular R wave then being measured by the operator.

Paper 50 is chemically treated heat sensitive recording paper of any well known type. Such paper responds to the heat of stylus 65A to form a dark trace on paper 50. If heat were continually applied to stylus 65A by way of heat coil 65B, as in the prior art, there is a good likelihood that the paper might catch on fire or make large darkened areas that obliterate the beginning portions of the waveform as the paper 50 starts from a stopped position.

In accordance with the principles of this invention, upon activity of the run switch, the writing stylus heat control circuit automatically applies a high energy pulse to rapidly heat the writing stylus 65A and thereafter hold the stylus heat at a predetermined amount. The problems created by electrocardiograph operation is further compounded by different paper speeds as required in different tests. In accordance with the principles of this invention, the various paper speeds are automatically compensated for in that the paper speed switch 221 automatically provides predetermined increases in heat as the paper speed is measured.

In order to interpret the strip chart recorder, it is necessary that time indications be provided on the strip chart recorder paper 50. These time indications are provided by galvanometer 70, which galvanometer is normally positioned out of contact with paper 50. Galvanometer 70 is driven into momentary contact with paper 50 by solenoid 71 under control of the marker stylus control circuit 40. Stylus 70A of galvanometer 70 is continually heated by the power source 38 by passage of current through a heating coil 70B which wraps around stylus 70A to supply heat thereto in a well known manner.

Constant heat of a suitable amount supplies time dots via stylus 70A of galvanometer 70 each time that solenoid 71 operates. Marker control circuit 40 activates solenoid 71 repetitively based upon a predetermined timing period. Inasmuch as the marker stylus 70A only touches the paper momentarily, there is no fear of burning the paper or creating fires during use of the instrument.

Figure 2:
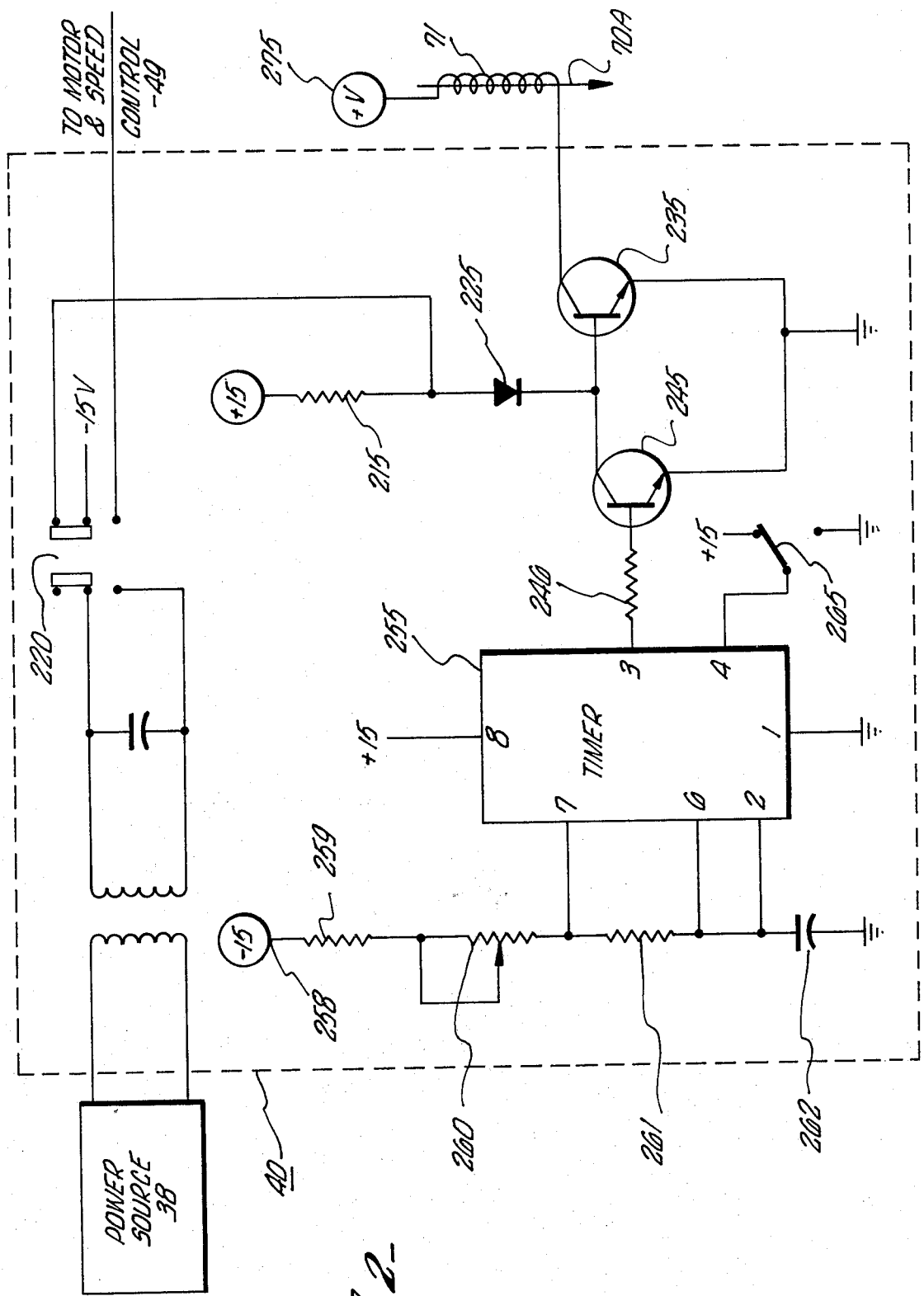
FIG. 2 is a detailed circuit schematic of the marker stylus control circuit shown in block form in FIG. 1.

FIG. 2 depicts the circuit details for the marker control circuit 40 of FIG. 1. Power source 38 is transformer coupled in a standard manner to an open run switch 220. When run switch 220 is closed by an operator, a suitable voltage is applied through a run signal lead to a speed control and motor circuit 49 so as to drive the strip chart recorder paper 50, FIG. 1.

In its normal open position, run switch 220 supplies a back-bias voltage to the junction of resistor 215 and diode 225. With diode 225 back-biased, transistor 235 is maintained in a normally non-conductive state. Closure of run switch 220 simultaneously supplies a run signal to the strip chart recorder and removes the back-bias from transistor 235.

The base of a transistor 245 is connected via resistor 246 to an output terminal of a timer 255. Timer 255 may be any suitable timer which emits a forward bias signal of a given duration once for each predetermined time interval. Such a signal is applied to transistor 245 on a repetitive basis. Forward bias on the base of transistor 245 causes it to be conductive. During the time transistor 245 conducts, transistor 235 is accordingly rendered conductive. With transistor 235 conductive a current flow path from voltage source 275 through solenoid 71 is established to ground through transistor 235.

Solenoid 71, when actuated, causes stylus 70A of galvanometer 70 to move into and out of contact with the strip chart recorder paper 50. As mentioned earlier in conjunction with FIG. 1, stylus 70A is continuously supplied with heating current from source 38. The momentary contact with paper 50 by stylus 70A repetitively records a timing mark on the strip chart recorder paper.

Timer 255 is continually supplied with power during the time that the electrocardiograph unit is in operation. Timer 255 may, for example, be an integrated circuit signetics modem NE/SE 555 having an output terminal 3, a reset terminal 4, a trigger terminal 2, threshold terminal 6, and discharge terminal 7. Terminals 7, 6 and 2 are connected to a voltage divider between ground and source 258, which divider includes resistors 259, 260 and 261. A capacitor 262 is charged and discharged to repeatedly activate timer 255 in a well known manner.

In accordance with this invention, timer 255 may be overridden by closure of an encoding switch 265. Encoding switch 265 is under manual command of an operator. Closure of switch 265 applies ground to reset terminal 4. Ground resets timer 255 and also supplies a signal to solenoid 71 for the time duration that switch 265 is closed. In accordance with a preferred aspect of this invention, the operator may employ switch 265 to record a series of marks on a margin of the chart paper 50, which marks identify each cardiac vector being traced by the writing stylus 65A at that moment in time. For example, the Lead No. 1 may be indicated by a dot i.e. a momentary closure of switch 265. Lead No. 2 may be indicated by two dots, Lead No. 3 by three dots. The waveform $aV_R$ may be indicated by one long dash, i.e. a longer closure of switch 265. A combination of dots and dashes may be employed to identify the several well known V positions as sensed by electrode movements to designated locations across the patient's chest. Switch 265 after conclusion of the encoding operation is returned to its normal position as shown in FIG. 2. That position allows timer 255 to reset. Thereafter one second time frame marks are recorded via solenoid 71 on the strip chart recorder paper 50 in the manner earlier described.

FIG. 3 is a detailed circuit schematic of the writing stylus heat control circuit 45. As originally noted in FIG. 1, the run switch controls both the writing stylus heat control circuit 45 of FIG. 3 and the marker stylus heat control circuit 40 of FIG. 2. With run switch 220 open, control circuit 45, FIG. 3, does not apply any heat to the writing stylus 65A of galvanometer 65. Waveform stylus 65A is in continuous contact with the strip chart recorder paper 50, FIG. 1. Because the stylus 65A is cold, and the paper is heat sensitive, the paper does not respond when run switch 220 is open. Accordingly, no marks are written on paper 50.

It is imperative, for the reasons noted earlier, that when the run switch 220 is closed that stylus 65A receive sufficient heat to immediately come to a proper writing temperature. Thereafter, stylus 65A must hold its temperature at an amount suitable to make a trace of desired darkness on the paper for the paper's given speed. In accordance with the principles of this invention, the foregoing features are accomplished by the heat control circuitry 45 of FIG. 3.

In operation, closure of the run switch 220, FIG. 3, applies an immediate power burst to stylus 65A, and then holds steady state power at a predetermined level as selected by an operator. As shown in FIG. 3, closure of the run switch 220 applies a potential from source 315 to an RC network 328. The RC network 328 comprises a series circuit of capacitor 321 and resistor 322, which series circuit is connected in parallel with a resistor 325. The parallel circuit is further connected in series between source 315 and ground by a potentiometer 335. If the RC network 328 were not present, resistor 325 and potentiometer 335 would act as a simple voltage divider. A voltage divider for the input to the operational amplifier 340 would simple provide a predetermined output signal according to the selected position of potentiometer adjustment 329.

The voltage input to the operational amplifier 340, because RC network 328 is present, drops immediately to a low level when run switch 220 is closed. Waveform 350 depicts the voltage waveform at junction 329. Assume that source 315 is $-15$ volts. As depicted by waveform 350, at time $t_o$ when switch 220 is closed, the voltage at junction 329 originally drops to a negative voltage in the order of $-9$ volts. As capacitor 321 charges, in series with resistor 322 and resistor 325 in parallel, the voltage as shown by waveform 350 rises to a more positive level 351 of approximately $-4$ volts.

Input waveform 350 is applied to an operational amplifier 340, which, in turn, is connected to a Darlington amplifier 360. The circuit further includes transistors 355, 356 and a negative feedback loop connected between the emitter of transistor 356 and an input terminal of operational amplifier 341. In response to the input waveform 350 the circuit of FIG. 3 develops an output heating voltage, waveform 375 for stylus 65A. Output voltage waveform 375 is essentially the inverse of waveform 350. As shown by waveform 375, the voltage of initially 0 volts, at time $t_o$, raises abruptly to a spike voltage of approximately 6 volts. After about one-quarter of a second the signal decays to a nominal value of approximately 4 volts.

Current flowing in the feedback loop flows through heater element 65B which surrounds stylus 65A. The high current flow from the spike voltage of waveform 375 immediately heats stylus 65A. The feedback loop nulls out the input voltage to operational amplifier 340. In approximately one quarter of a second the circuit stabilizes and holds the heating current at a constant level for the duration of a run.

Different operators desire different darkness for the trace by stylus 65A. For this reason, potentiometer 329 is adjustable so that the input signal to operational amplifier 340 is variable. Because the output signal at heater 65B is a function of the input signal for amplifier 340, the output at waveform 375 is also adjustable. Thus, the height and width of the spike voltage at waveform 375 is subject to adjustment by an operator. The time duration of the initial energy burst is determined by selecting different values for the input to the operational amplifier 340. In addition, the resistance in the feedback circuitry of the control circuit of FIG. 3 may be varied depending upon the condition of switch 385.

Paper speed switch 385 is connected across resistor 379. As shown in FIG. 3, paper speed switch 385 is in a closed condition indicative of a slow paper speed. Closed switch 385 bypasses resistor 379 removing it from the feedback loop.

In the event that the operator desires a faster paper speed, it is necessary to increase the heating current for writing stylus 65A. Opening the paper speed switch 385 adds resistor 379 in series with resistor 378 and thus develops a larger feedback resistance. In accordance with well known feedback theory, a larger feedback resistance causes a larger output voltage. Accordingly, heater coil 65B develops more initial heat for writing stylus 65A. The darkness of the waveform on the recorder paper 50 is adjusted in the manner described, to be essentially uniform for either of the two noted paper speeds. Whereas the feedback circuity has been described as involving only two paper speeds, it will be readily apparent to those skilled in the art that additional paper speeds can be accommmodated. Additional switches and feedback resistors may selectively short out or add resistance in the feedback loop as is required for several different paper speeds.

Paper for a strip chart recorder 50 is normally layed out in millimeter grids. Typical paper speeds are 25 millimeters per second or 50 millimeters per second. A stylus such as Birtcher Catalog No. 307 may be employed in the electrocardiograph of this invention. In such an instance the following values may be employed for the heater control circuit of FIG. 3:

| | |
|---|---|
| Resistor 325 | 18 K ohms |
| Capacitor 321 | 680 uf |
| Resistor 322 | 20 K ohms |
| Resistor 345 | 72 K ohms |
| Transistors 355 and 356 | IC 306 or Type MJE 720 |
| Operational Amplifier | IC 303/741 |
| Resistor 378 | 27 K ohms |
| Resistor 379 | 5.6 K ohms |

It is to be understood that the foregoing features and principles of this invention are merely descriptive, and that many departures and variations thereof are possible by those skilled in the art, without departing from the spirit and scope of this invention.

What is claimed is:

1. An electrocardiograph unit having means for receiving and amplifying signals derived from electrodes placed on a patient's body, a strip chart recorder supplied with heat sensitive paper and a waveform stylus for recording said waveforms in visible form, the improvement comprising:

a marker stylus provided with continuous heat when the electrocardiac unit is in operation;

means for automatically moving said marker stylus into and out of contact with said paper, thereby applying a time reference mark on the heat sensitive paper; and means, responsive to an operator for overriding said automatic maker stylus moving means and moving said marker stylus into and out of contact with said paper under control of the operator, thereby supplying encoded marks indicative of the electrocardiograph waveform then being written on said paper by said waveform stylus.

2. An electrocardiograph in accordance with claim 1 and further comprising:

a run switch operable for bringing the heat sensitive paper from a stopped position to a selected speed; and means for applying an initial surge of heating current in excess of a predetermined level to said waveform stylus in response to operation of the run switch.

3. An electrocardiograph in accordance with claim 2 wherein:

said heat applying means includes means for automatically reducing the heating current to said predetermined level immediately following application of said initial surge of heating current to said waveform stylus.

4. An electrocardiograph in accordance with claim 2 wherein said heating current applying means comprises:

an amplifier receiving an input voltage upon operation of said run switch;

an electrical coil for heating the waveform stylus; and means connecting said coil in a negative feedback loop for said amplifier.

5. An electrocardiograph in accordance with claim 4 and further comprising:

means connecting a source of potential through said run switch to an input terminal of said amplifier for initially supplying a high spike voltage followed by a lower steady state voltage to said amplifier.

6. An electrocardiograph in accordance with claim 5 wherein said connecting means comprises:

a resistance/capacitor circuit connected between the potential source and the input terminal of said amplifier.

7. An electrocardiograph unit having means for receiving and amplifying signal combinations from electrodes placed on a patient's body and a strip chart recorder supplied with heat sensitive paper for recording waveforms indicative of various signal combinations, the unit comprising:

a heated waveform stylus for recording individual waveforms indicative of signal combinations selected by an operator;

a run switch operable for bringing the heat sensitive paper from a stopped position to a selected speed; and means for applying heat by applying an initial surge of heating current in excess of a predetermined level to said waveform stylus in response to operation of the run switch, said heat applying means including means for automatically reducing the heating current to said predetermined level immediately following application of said initial surge of heating current to said waveform stylus.

8. An electrocardiograph in accordance with claim 7 wherein said heat applying means comprises:

a negative feedback amplifier receiving an input potential upon operation of said run switch; and a heater coil for said stylus connected in the feedback circuit of said amplifier.

9. An electrocardiograph in accordance with claim 8 and further comprising:

a marker stylus provided with continuous heat when the electrocardiograph unit is in operation;

means for automatically moving said marker stylus into and out of contact with said paper, thereby applying a time reference mark on the heat sensitive paper; and manually operative means overriding said automatic marker stylus moving means for supplying encoded marks indicative of the electrocardiograph waveform then being recorded on said paper by said marker stylus.

10. An electrocardiograph in accordance with claim 7, further comprising:

means for increasing the initial surge of heating current supplied by said heat applying means when a faster paper speed is utilized.

* * * * *

UNITED STATES PATENT AND TRADEMARK OFFICE
CERTIFICATE OF CORRECTION

PATENT NO. : 3,908,641
DATED : September 30, 1975
INVENTOR(S) : Donald W. Judson et al It is certified that error appears in the above—identified patent and that said Letters Patent are hereby corrected as shown below:

Column 2, line 40, delete "imediately" and insert --immediately--.
Column 3, line 47, delete "Ore." and insert --Oregon--.
Column 4, line 63, delete "measured" and insert --increased--.

Signed and Sealed this second Day of March 1976

[SEAL]

Attest:

RUTH C. MASON
Attesting Officer

C. MARSHALL DANN
Commissioner of Patents and Trademarks